S-FILTER

Filed April 4, 1968

INVENTOR,
SAMUEL JOSEPH CAMPANELLA.

BY Harry M. Saragovitz,
Edward J. Kelly, Herbert Berl
& Julian C. Keppler

ATTORNEYS

United States Patent Office 3,524,081
Patented Aug. 11, 1970

3,524,081
S-FILTER

Samuel Joseph Campanella, Springfield, Va., assignor, by mesne assignments, to the United States of America as represented by the Secretary of the Army
Filed Apr. 4, 1968, Ser. No. 718,793
Int. Cl. H03k *5/08*
U.S. Cl. 307—317 9 Claims

ABSTRACT OF THE DISCLOSURE

An electrical filter made up of a standard RC or LC filter in which the resistor or inductor is shunted by a pair of back biased, oppositely poled diodes, each associated with a power source, in series with a resistor or an inductor respectively.

BACKGROUND OF INVENTION

The present invention relates generally to electrical filters and more particularly to a filter which will permit the selective smoothing of perturbations of high frequency and small amplitude, that occur on vocoder signals as a consequence of vocal pitch interference, while not degrading the capacity to respond to a fast amplitude transition of significant finite amplitude change.

In the field of smoothing filters, it has been the general practice to employ linear low pass filters of the simple RC low pass type, of the Bessel type and of the purely LC low pass type. Although such devices have served the purpose, they have not proved entirely satisfactory since none provides a smoothing characteristic that varies as a function of perturbation amplitude and hence they will remove the small amplitude high frequency perturbations only at the expense of severely slowing the transient response to significant finite amplitude transitions.

SUMMARY OF INVENTION

The general purpose of the invention is to provide a filter which embraces all the advantages of similarly employed devices and possesses none of the disadvantages. To obtain this, the present invention contemplates the introduction of a non-linear element in such a way as to cause the filter to have a long time integrating response for small amplitude perturbations but a fast time response for amplitude changes of large amplitude. In this way high frequency perturbations of small amplitude are removed while transient responses to amplitude variations of significantly large differences are not impaired.

DESCRIPTION OF DRAWINGS

The exact nature of this invention will be readily apparent from consideration of the following specification relating to the annexed drawing in which.

DESCRIPTION OF PREFERRED EMBODIMENT

Figure 1:
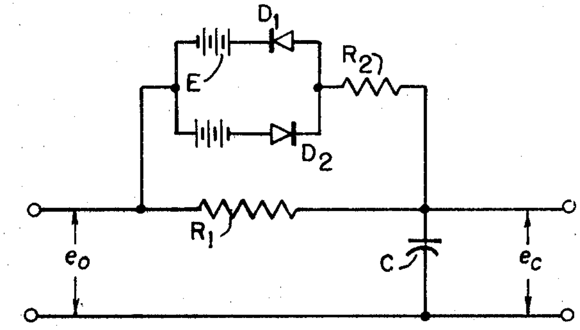
FIG. 1 shows a schematic view of the circuit of a prefrered embodiment of the invention.

Referring now to the drawings, there is shown in FIG. 1 a conventional low pass filter consisting of $R_1$ and C in which the resistor $R_1$ is bypassed by a resistor $R_2$ in series with a parallel pair of biased diodes $D_1$ and $D_2$. When the absolute difference between the output voltage $e_c$ and the input voltage $e_o$ is such that $|e_c - e_o| < \Delta E$ as it is for small amplitude perturbations the diode bypass path is inactive (i.e. open) and the filter behaves as a normal RC low pass filter with a time constant $T_1 = R_1C$. This time constant can be made quite large so that small perturbations are greatly smoothed, however, when $e_o$ suddenly undergoes a large excursion such that $|e_c - e_o| > \Delta E$ one of the diodes will conduct thereby shunting $R_1$ with $R_2$ and hence reducing the time constant to the value $$\frac{R_1R_2}{R_1+R_2}C$$

If $R_2$ is much smaller than $R_1$ this value approximately equals $R_2C$ thus providing a much lower time constant when a sudden significantly size transient in $e_o$ occurs. In operation it is necessary to scale the inert zone, determined by the back-bias potential ΔE on the diodes as a result the bias is small relative to the range expected in $e_o$. Typically, we have let $\Delta E = \frac{1}{10} e_{o_{max}}$. Perturbation in $e_o$ of less than ΔE, are heavily suppressed by the S-filter significantly increases and therefor the perturbation appears in $e_c$. It is significant to note that the S-filter causes no shift in any D.C. value present to its input provided it is terminated in an impedance which is very high compared to $R_1$.

Figure 2:
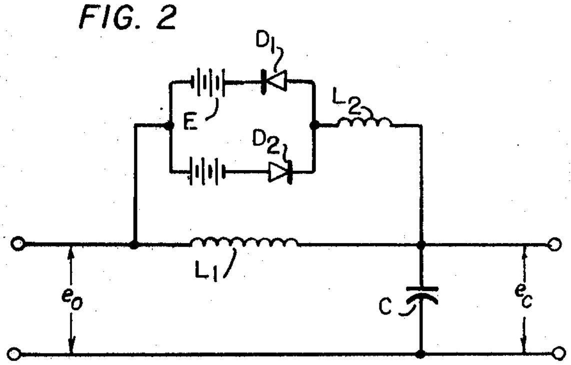
FIG. 2 illustrates a second embodiment of the invention.

FIG. 2 utilizes the same inventive concept; in this case, however, the basic filter utilized is an LC filter. It should be understood, of course, that the foregoing disclosure relates to only two preferred embodiments of the invention and that other modifications or alterations may be made therein without departing from the scope of the invention as set forth in the appended claims.

What is claimed is:

1. A filter network comprising:
an input for receiving high frequency voltage signals;
a first resistor having a first and a second terminal, said first terminal connected to said input;
a capacitor connected to said second terminal;
a second resistor having a first and a second terminal, said first terminal connected to the second terminal of said first resistor;
a pair of oppositely poled, parallel connected diodes connected between the first terminal of said first resistor and the second terminal of said second reond resistor; and
an output terminal connected to a junction point of the second terminal of the first resistor and the first terminal of the second resistor.

2. The device of claim 1 in which said first resistor is much larger than said second resistor.

3. The device of claim 2 further including:
a bias voltage source connected in series with each said diode to back bias said diodes.

4. A filter network comprising:
a conventional low pass filter composed of a resistor and a capacitor in series circuit;
a source of input signals connected to said low pass filter; and
means connected across said resistor to effectively change the time constant of the filter network whenever the amplitude of said input signals suddenly undergoes a large expansion.

5. The device of claim 4 in which said means consists of a pair of oppositely poled, parallel connected diodes connected in series with a second resistor.

6. The device of claim 5 further including:
a bias voltage source connected in series with each said diode to back bias said diodes.

7. A filter network comprising:
a conventional low pass filter composed of an inductor and a capacitor connected in series circuit;
a source of input signals connected to said low pass filter; and
means connected across said inductor to effectively change the time constant of the filter network whenever the amplitude of said input signals suddenly undergoes a large excursion.

8. The device of claim 7 in which said means consists of a pair of oppositely poled, parallel connected diodes connected in series with a second inductor.

9. The device of claim 8 further including:

a bias voltage source connected in series with each said diode to back bias said diode.

References Cited

UNITED STATES PATENTS

| | | | |
|---|---|---|---|
| 2,835,867 | 5/1958 | Golden | 307—317 XR |
| 2,999,173 | 9/1961 | Ruck | 307—237 XR |

FOREIGN PATENTS

| | | | |
|---|---|---|---|
| 1,163,147 | 4/1958 | France. | |
| 3,015,767 | 1/1962 | Taylor | 307—317 XR |
| 3,023,355 | 2/1962 | Thorsen | 307—317 XR |

STANLEY T. KRAWCZEWICZ, Primary Examiner

U.S. Cl. X.R.

307—237, 295; 328—167, 171